(12) United States Patent
Weinberg et al.

(10) Patent No.: US 8,515,036 B2
(45) Date of Patent: *Aug. 20, 2013

(54) AUTOMATED CREATION OF MULTIPLE PROVIDER SERVICES

(75) Inventors: David Weinberg, San Francisco, CA (US); Judith F. Beningson, Westford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/537,143

(22) Filed: Jun. 29, 2012

(65) Prior Publication Data

US 2012/0265642 A1    Oct. 18, 2012

Related U.S. Application Data

(63) Continuation of application No. 12/174,076, filed on Jul. 16, 2008, now Pat. No. 8,233,600.

(60) Provisional application No. 60/950,311, filed on Jul. 17, 2007.

(51) Int. Cl.
*G06Q 20/02* (2012.01)
*H04M 15/00* (2006.01)

(52) U.S. Cl.
USPC ............... 379/114.01; 379/265.11; 455/406; 705/26.42; 705/26.44; 705/34; 705/35; 705/40; 726/17

(58) Field of Classification Search
USPC .... 379/114.01, 265.11; 455/406; 705/26.42, 705/26.44, 34, 40, 35; 726/17
See application file for complete search history.

(56) References Cited

U.S. PATENT DOCUMENTS

| | | | |
|---|---|---|---|
| 5,737,414 A * | 4/1998 | Walker et al. | 705/40 |
| 6,760,707 B2 | 7/2004 | Provost | |
| 6,944,536 B2 | 9/2005 | Singleton | |
| 6,990,467 B1 | 1/2006 | Kwan | |
| 7,023,979 B1 * | 4/2006 | Wu et al. | 379/265.11 |
| 7,089,594 B2 | 8/2006 | Lal et al. | |
| 7,110,525 B1 * | 9/2006 | Heller et al. | 379/265.11 |
| 7,136,651 B2 | 11/2006 | Kalavade | |
| 7,218,776 B2 | 5/2007 | Sowinski et al. | |
| 7,356,507 B2 * | 4/2008 | Bezos et al. | 705/40 |
| 7,487,126 B2 | 2/2009 | Kwan | |
| 7,533,047 B2 | 5/2009 | Hagale et al. | |
| 7,536,351 B2 * | 5/2009 | Leblang et al. | 705/40 |
| 7,540,408 B2 | 6/2009 | Levine et al. | |
| 7,542,755 B2 * | 6/2009 | Uhlik et al. | 455/406 |

(Continued)

OTHER PUBLICATIONS

Co-pending U.S. Appl. No. 12/174,076, filed Jul. 16, 2008 entitled "Automated Creation of Multiple Provider Services" by David Weinberg et al., 34 pages.

*Primary Examiner* — Gerald Gauthier
(74) *Attorney, Agent, or Firm* — Harrity & Harrity, LLP

(57) ABSTRACT

A method may include receiving, at a service server, a request for services from a requesting device. The service server may identify one or more service options responsive to the request and send a list of the identified service options to the requesting device. The service server may receive a selected service option from the requesting device. The service server may collect payment information for the selected service option from the requesting device and providing accounting information to a service provider of the selected service option based on the payment information.

20 Claims, 6 Drawing Sheets

(56) References Cited

U.S. PATENT DOCUMENTS

| | | | |
|---|---|---|---|
| 7,542,943 B2 * | 6/2009 | Caplan et al. | 705/40 |
| 7,599,844 B2 | 10/2009 | King et al. | |
| 7,664,676 B2 | 2/2010 | Van Do et al. | |
| 7,680,698 B2 * | 3/2010 | Lutnick | 705/26.35 |
| 7,784,029 B2 | 8/2010 | Hassan et al. | |
| 7,805,365 B1 * | 9/2010 | Slavin et al. | 705/40 |
| 7,839,803 B1 | 11/2010 | Snelgrove et al. | |
| 7,925,518 B2 * | 4/2011 | Lee et al. | 705/2 |
| 7,953,652 B1 * | 5/2011 | Hurewitz | 705/35 |
| 8,099,343 B1 * | 1/2012 | O'Neil et al. | 705/34 |
| 8,233,600 B1 * | 7/2012 | Weinberg et al. | 379/114.01 |
| 2004/0024707 A1 | 2/2004 | Perre et al. | |
| 2004/0068446 A1 | 4/2004 | Do et al. | |
| 2004/0117306 A1 | 6/2004 | Karaoguz et al. | |
| 2004/0193752 A1 | 9/2004 | Singh et al. | |
| 2006/0085840 A1 | 4/2006 | Bruck et al. | |
| 2006/0090203 A1 * | 4/2006 | Husain et al. | 726/17 |
| 2006/0229985 A1 | 10/2006 | Lalwani et al. | |
| 2006/0265344 A1 | 11/2006 | Woods | |
| 2007/0078924 A1 | 4/2007 | Hassan et al. | |
| 2007/0130020 A1 | 6/2007 | Paolini | |
| 2007/0185775 A1 | 8/2007 | Lawton | |
| 2008/0201257 A1 | 8/2008 | Lewis et al. | |
| 2008/0313053 A1 | 12/2008 | Li et al. | |
| 2011/0313919 A1 * | 12/2011 | Evans et al. | 705/40 |
| 2012/0054070 A1 * | 3/2012 | Flubr et al. | 705/26.42 |
| 2012/0265642 A1 * | 10/2012 | Weinberg et al. | 705/26.44 |

* cited by examiner

AUTOMATED CREATION OF MULTIPLE PROVIDER SERVICES

RELATED APPLICATIONS

This application is a continuation of U.S. patent application Ser. No. 12/174,076, filed Jul. 16, 2008, which claims priority under 35 U.S.C. §119 based on U.S. Provisional Patent Application No. 60/950,311, filed Jul. 17, 2007, the disclosures of which are incorporated by reference herein in their entireties.

BACKGROUND

Users currently have available to them both "open" or uncontrolled networks (e.g., access to free services on the Internet) and "closed" or controlled networks (e.g., Internet multimedia subsystems (IMSs)). Somewhere in between these two extremes is the philosophy of a shared network infrastructure that promotes IP (Internet Protocol) convergence. Various industry associations seek to develop a universal and commercially sustainable framework for the assembly and delivery of services on converged infrastructures. This framework may enable network operators and service providers to streamline processes, contain operations costs, and deliver a broader array of new services.

SUMMARY

In one implementation, a method may include receiving, at a service server, a request for services from a requesting device, where the services are to be distributed over a network. The service server may identify one or more service options responsive to the request and send a list of the identified service options to the requesting device. The service server may receive a selected service option from the requesting device. The service server may collect payment information for the selected service option from the requesting device and allocate payment for the selected service option to a provider of the selected service option and to another component within the network that enabled the provider to provide the selected service option.

In another implementation, a system may include a service server to facilitate automated creation of pan-provider services distributed over a network. The service server may include a service repository to store information associated with services provided by providers, the information associated with services including service options for a user device requesting services. The service server may also include globally unique identifier logic to assign a globally unique identifier to a user and each of the providers, the globally unique identifier being used to facilitate a transaction. The service server may further include transaction accounting logic to collect payment information from the user device requesting the services and to allocate payment for the services to each of the providers used in providing the services.

In another implementation, a computer-readable memory comprising computer-executable instructions may be provided. The computer-readable memory may include one or more instructions to register a user of a requesting device for services provided by a services server, the registering including payment information of the user; one or more instructions to receive a request for services from the requesting device; one or more instructions to identify a service option responsive to the request; one or more instructions to send the identified service option to the requesting device; one or more instructions to receive authorization from the requesting device for providing the selected service option over a network to the requesting device; one or more instructions to collect payment from the user based on the payment information; and one or more instructions to provide accounting information based on the selected service option to a service provider of the selected service option.

In still another implementation, a system is provided that may include means for receiving, at a service server, a request for services from a requesting device; means for identifying one or more service options responsive to the request; means for sending a list of the identified service options to the requesting device; means for receiving a selected service option from the requesting device, a plurality of service providers operating together to provide a service associated with the selected option; means for collecting payment for the selected service option from the requesting device; and means for allocating payment for the selected service option among the plurality of service providers operating together to provide the service associated with the selected service option.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the invention. Instead, the scope of the invention is defined by the appended claims and equivalents.

Currently, no infrastructure exists to facilitate creation of pan-provider services (i.e., services provided across multiple providers). For example, for a fee, an end user (e.g., a customer of an Internet service provider) may access content on a web site located in Great Britain (e.g., videos provided by the British Broadcasting Corporation (BBC)). If the end user is located, for example, in California, the signal originating at the end user may pass through multiple networks until it reaches the last network, owned by the BBC in this example, where the content is offered. If the user wishes to purchase such content from the web site located in Great Britain, the user may pay a fee and may view the content on his/her personal computer in California. The entire fee, however, is typically collected by the last network in the chain (in this case, the BBC), even though the signal passed through multiple intervening networks on its way to the web site. Currently, no mechanism exists to enable the owners of the intervening networks to collect a portion of the content fee for use of their networks.

Implementations described herein may include systems and methods that create a service for elements (e.g., networks, servers, and other network components that facilitate data transmissions) of multiple stakeholders (e.g., service providers, enterprise system providers, etc.) to enable the multiple stakeholders to charge for use of their elements. For example, the systems and methods may automatically create a pan-provider Virtual Private Network (VPN) service. In one implementation, the systems and methods may provide an infrastructure to facilitate automated creation of pan-provider services. The systems and methods may include databases (e.g., repositories) that may contain descriptions of the individual elements (or components) of the service and may assign a globally unique identifier (GUID) to each user and element owner (e.g., service provider). The systems and methods described herein may facilitate creation of various services. For example, the systems and methods may be used for inter-provider based Internet multimedia subsystem (IMS) services and/or other proprietary (e.g., non-standards based) approaches. The systems and methods may compensate for such services by charging a listing fee, a recurring fee, a percentage of transaction fee, and/or any other fee-based arrangement.

As used herein, the terms "user" and "user device" are intended to be broadly interpreted to include a user device and/or a user of a user device.

Exemplary System

Figure 1:
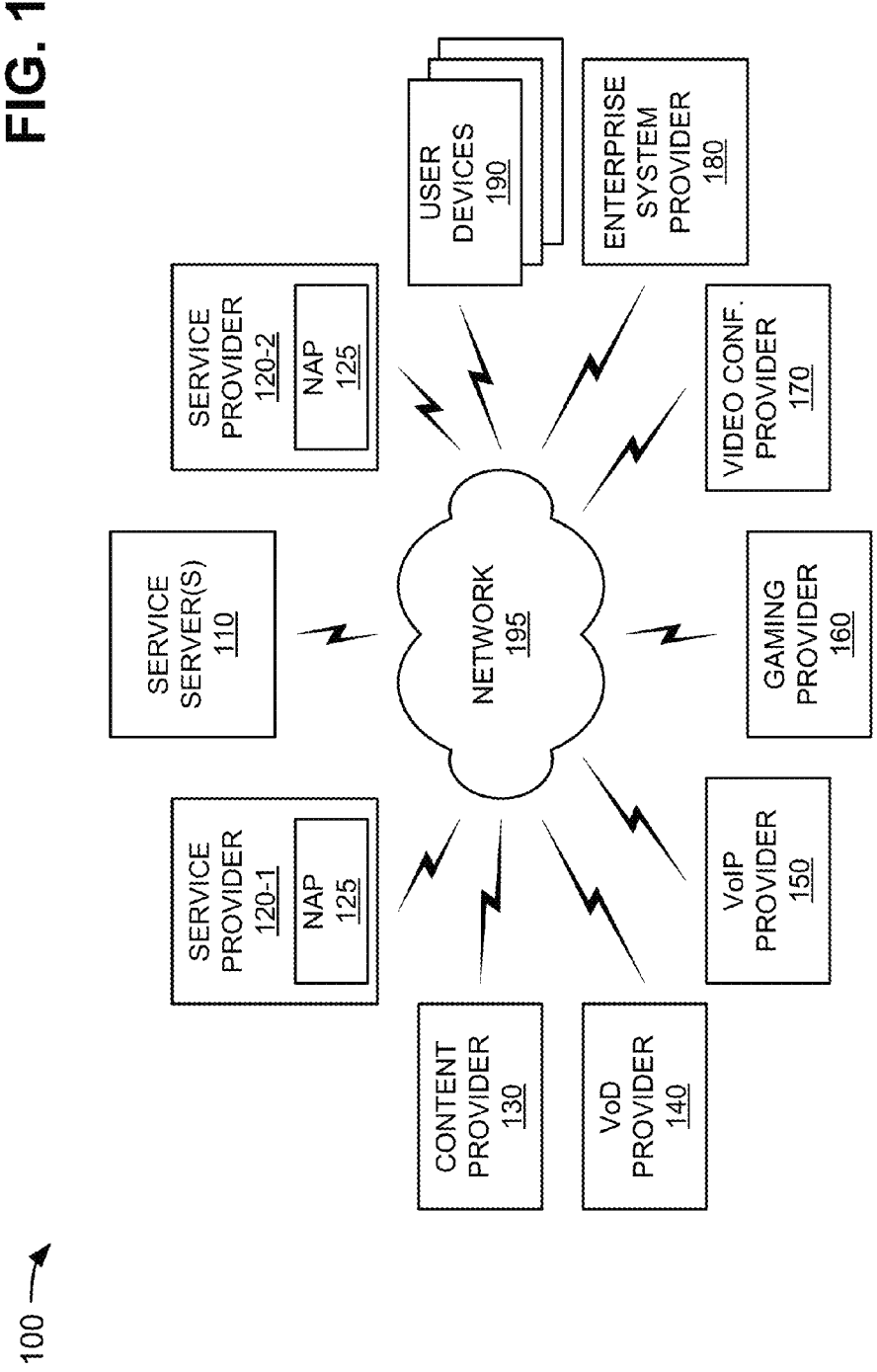
FIG. 1 is a diagram of an exemplary network in which the concepts described herein may be implemented.

FIG. 1 illustrates an implementation that includes a system 100 capable of performing the techniques described herein. As illustrated, system 100 may include one or more service servers 110, one or more service providers 120-1, 120-2 (collectively referred to as "service providers 120"), a content provider 130, a video on demand (VoD) provider 140, a voice over IP (VoIP) provider 150, a gaming provider 160, a video conferencing provider 170, an enterprise system provider 180, and/or one or more user devices 190 interconnected by a network 195.

Each service server 110 may include a server or group of servers that are capable of facilitating creation of various services (e.g., inter-provider based IMS services, and/or other proprietary approaches). In one implementation, service server(s) 110 may provide an infrastructure to facilitate automated creation of pan-provider services. Service server(s) 110 may include databases that may contain descriptions of the individual elements (or components) of the service and may assign a GUID to each user (e.g., a user of user device 190) and each element owner (e.g., one of service providers 120). Further details of service server(s) 110 are provided below in connection with FIGS. 2 and 3.

Service providers 120 may include one or more networks, servers, network devices, etc. that provide services (e.g., Internet access, mobile phone access, web application hosting, etc.) to entities (e.g., to one or more user devices 190). In one example, service providers 120 may include Internet service providers (ISPs) that provide to consumers (e.g., via one or more user devices 190) access to the Internet and related services (e.g., Internet transit, domain name registration and hosting, web hosting, etc.). As further shown in FIG. 1, each of service providers 120 may include a network application platform (NAP) 125 that enables service servers 110 to automatically create pan-provider services. Further details of NAP 125 are provided below in connection with FIG. 4.

Content provider 130 may include one or more server entities that are capable of providing TV programming, video content (e.g., movies, on-demand services, live television, etc.), user-generated content, etc. to one or more user devices 190. In one implementation, user devices 190 may access content provided by content provider 130 via one or more of service providers 120.

VoD provider 140 may include one or more server entities that are capable of providing video-on-demand (VoD) services to one or more user devices 190. VoD provider 140 may allow the users of user devices 190 to select and watch video and clip content over the network as part of an interactive television system. VoD provider 140 may permit the user to either "stream" the content, allowing viewing in real time, or to "download" the content in its entirety (e.g., prior to viewing). In one implementation, user devices 190 may access the video on demand services provided by VoD provider 140 via one or more of service providers 120.

VoIP provider 150 may include one or more networks, server entities, network devices, etc. that provide VoIP services to one or more user devices 190. VoIP provider 150 may permit routing of voice conversations over the Internet or through any other IP-based network. In one implementation, user devices 190 may access the VoIP services provided by VoIP provider 150 via one or more of service providers 120.

Gaming provider 160 may include one or more server entities that provide online gaming services (e.g., single or multiplayer online games) to one or more user devices 190. In one implementation, user devices 190 may access the gaming services provided by gaming provider 160 via one or more of service providers 120.

Video conferencing provider 170 may include one or more server entities that provide network-based video conferencing services to one or more user devices 190. In one implementation, user devices 190 may access the video conferencing services provided by video conferencing provider 170 via one or more of service providers 120.

Enterprise system provider 180 may include one or more server entities that provide enterprise system services to one or more user devices 190. In one example, enterprise system provider 180 may provide access to systems that run all phases of an enterprise's operations to facilitate cooperation and coordination of work across the enterprise. In one implementation, user devices 190 may access the enterprise system services provided by enterprise system provider 180 via one or more of service providers 120.

User devices 190 may include any devices capable of permitting a user to access content provider 130, VoD provider 140, VoIP provider 150, gaming provider 160, video conferencing provider 170, and/or enterprise system provider 180, via the network 195. For example, user devices 190 may include personal computers, wireless telephones, personal digital assistants (PDAs), laptops, television systems, or other types of computation or communication devices.

Network 195 may include one or more networks of any type, including a local area network (LAN), a metropolitan area network (MAN), a wide area network (WAN), an Internet, an intranet, or a telephone network (e.g., the Public Switched Telephone Network (PSTN) or a cellular network), or a combination of networks. The components shown in FIG. 1 may connect to network 195 via wired and/or wireless connections.

In one implementation, user devices 190 may access any of the services provided by, for example, content provider 130, VoD provider 140, VoIP provider 150, gaming provider 160, video conferencing provider 170, and/or enterprise system provider 180, via one or more of service providers 120. User devices 190 may be presented with fee-based options for accessing such services. For example, if user device 190 wishes to access a video provided by VoD provider 150, user device 190 may be presented with fee-based options (e.g., highest quality video $10.00, moderate quality video $5.00, lowest quality video $2.00) for accessing the video. If user device 190 selects the highest quality video, one of service servers 110 may provide a mechanism that allocates the $10.00 fee among the infrastructure providing the video (e.g., VoD provider 140 and one or more of service providers 120). In one implementation, the allocation mechanism may be based on standards set forth by an industry association (e.g., the Telemanagement (TM) Forum or the IPsphere Forum), a listing fee, a recurring fee, a percentage of transaction fee, and/or any other fee-based arrangement.

In one implementation, service server(s) 110 may assign information and/or may receive assigned information (e.g., pricing information, technical information, GUIDs, etc.) to each element (e.g., network devices, servers, services, etc.) offered by the providers (e.g., service providers 120, content provider 130, VoD provider 140, VoIP provider 150, gaming provider 160, video conferencing provider 170, enterprise system provider 180, etc.). Such information may be collected in repositories (e.g., service repositories) and managed by service server(s) 110. Service server(s) 110 may receive a request (e.g., from one of the user devices 190) for a service provided by system 100, and may use the repository information to determine the providers needed to provide the requested service. If the requested service is provided (e.g., to user device 190), service server(s) 110 may use the repository information to determine allocation of a fee for the service. For example, service servers 110 may allocate the fee to the determined providers (e.g., the providers that provided the service with their elements) using a variety of mechanisms (e.g., a listing fee, a recurring fee, a percentage of transaction fee, and/or any other fee-based arrangement). Service server(s) 110 may further provide accounting and/or billing services for such a transaction.

Although FIG. 1 shows exemplary components of system 100, in other implementations, system 100 may contain fewer, different, or additional components than depicted in FIG. 1. In still other implementations, one or more components of system 100 may perform one or more other tasks described as being performed by one or more other components of system 100. Also, although FIG. 1 shows system 100 including two service providers, one content provider, one VoD provider, one VoIP provider, one gaming provider, one video conferencing provider, and one enterprise system provider, in other implementations system 100 may include any other service provided over interconnected networks.

Exemplary Service Server

Figure 2:
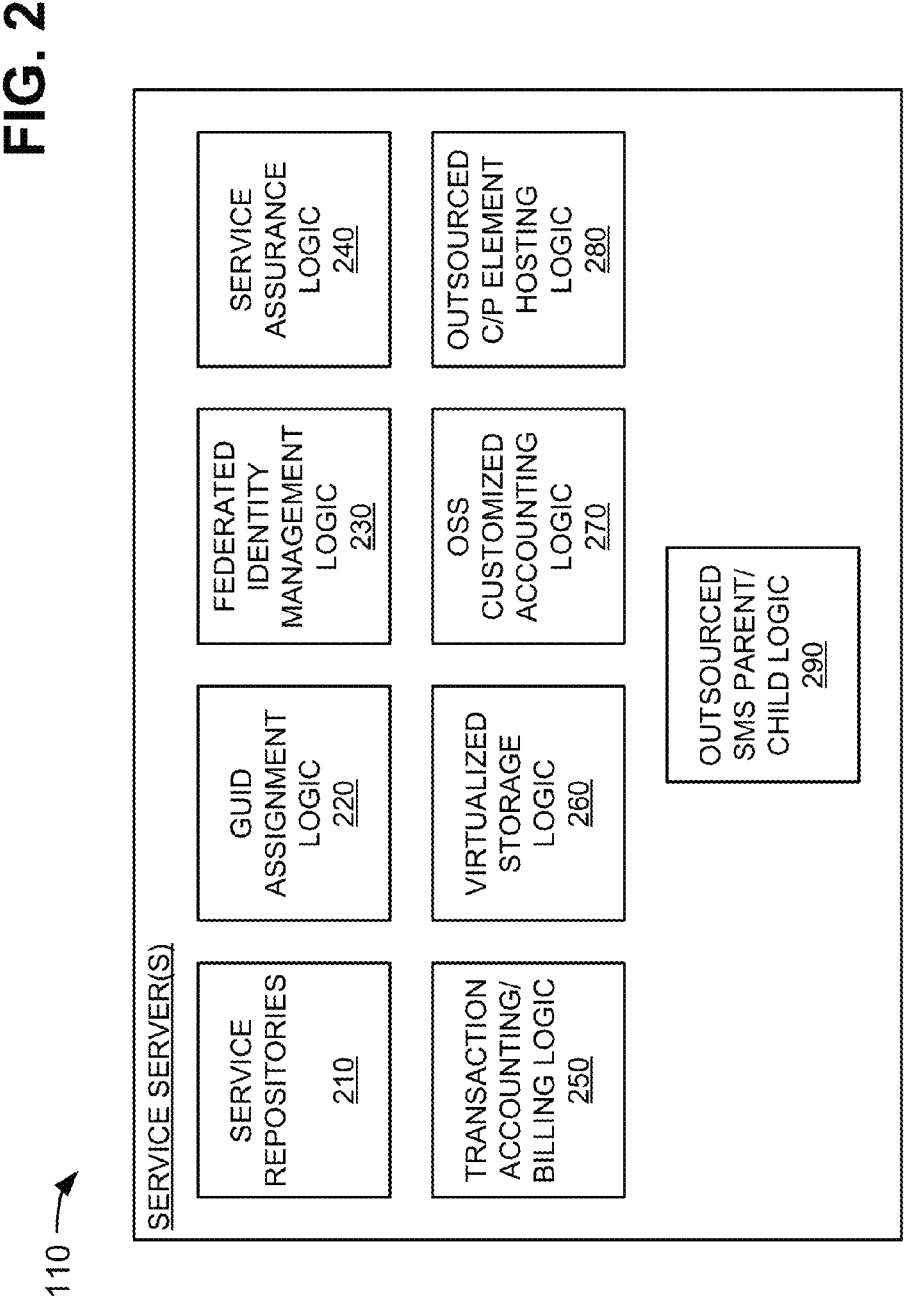
FIG. 2 is a functional block diagram of exemplary logic components of a service server of FIG. 1.

FIG. 2 illustrates exemplary components of one of service servers 110. The other service servers 110 may contain comparable components. As illustrated, service server 110 may include service repositories 210, GUID assignment logic 220, federated identity management logic 230, service assurance logic 240, transaction accounting and/or billing logic 250, virtualized storage logic 260, Operations Support System (OSS) customized accounting logic 270, outsourced content/price (C/P) element hosting logic 280, and/or outsourced structured management system (SMS) parent/child logic 290.

Service repositories 210 may include one or more databases or repositories that store information associated with services provided by service server 110. For example, service repositories 210 may include information such as GUIDs of customers (e.g., service providers 120, content providers 130, users of the user devices 190, etc.) of the services provided by service server 110, infrastructure associated with the services provided by service server 110, lists of elements, element owners, locations of elements, pricing associated with elements, nested elements, mapping information, billing information, accounting information, address information, federated identity management information, customer information (e.g., passwords, etc.), service definitions, service templates, etc.

GUID assignment logic 220 may include hardware- and/or software-based logic to perform GUID assignment on behalf of service server 110. For example, GUID assignment logic 220 may assign GUIDs to customers (e.g., service providers 120, users of the user devices 190, etc.) of the services provided by service server 110. The GUIDs may enable service server 110 to allocate payment for services provided by system 100. For example, if one of user devices 190 accesses content (e.g., for a fee of $10.00) from content provider 130, both service providers 120-1 and 120-2, the GUIDs of the content provider 130 and service providers 120-1 and 120-2 may be used to allocate the fee among the content provider 130 and the two service providers 120-1 and 120-2.

Federated identity management logic 230 may include hardware- and/or software-based logic to perform federated identity management on behalf of service server 110. For example, federated identity management logic 230 may enable portability of identity information across otherwise autonomous security domains (e.g., to protect people against identity theft). Federated identity management logic 230 may enable users of one domain to securely access data or systems of another domain seamlessly, and without the need for redundant or additional user administration.

Service assurance logic 240 may include hardware- and/or software-based logic to perform service assurance to the providers of system 100. For example, service assurance logic 240 may provide pan-provider service assurance based on a fee (e.g., on a per service basis) for services provided by service server 110.

Transaction accounting/billing logic 250 may include hardware- and/or software-based logic to perform transaction accounting and/or billing services on behalf of the providers of system 100. For example, transaction accounting/billing logic 250 may collect payment from user devices 190 for accessing or using the networks (e.g., network 195) and/or the services of system 100, and/or may allocate payment for the services to the appropriate components of system 100 (e.g., to the components of system 100 providing the paid-for service).

Virtualized storage logic 260 may include hardware- and/or software-based logic to perform virtualized storage on behalf of the providers of system 100. For example, virtualized storage logic 260 may offer storage of content offered by the providers of system 100. This may minimize traffic to and/or from the providers' sites, and/or may minimize storage requirements for the providers (e.g., content provider 130 may store its content with one or more of service servers 110). Such an arrangement may also provide redundancy, backup, and/or geographic diversity (e.g., for quality performance and/or latency).

OSS customized accounting logic 270 may include hardware- and/or software-based logic to perform OSS customized accounting on behalf of the providers of system 100. For example, OSS customized accounting logic 270 may customize accounting output to each provider's custom OSS format. This may lower the barrier for participation in system 100 for service providers 120 since costs associated with OSS changes may be large.

Outsourced C/P element hosting logic 280 may include hardware- and/or software-based logic to perform content and/or price hosting on behalf of the providers of system 100. For example, outsourced C/P element hosting logic 280 may host the providers' cost and/or pricing elements, and/or may provide a hosting and/or data center for the providers of system 100.

Outsourced structured management system (SMS) parent/child logic 290 may include hardware- and/or software-based logic to perform SMS services on behalf of the providers of system 100. SMS services may include identifying one or more paths through multiple networks to connect a requesting device and a service provider. For example, outsourced SMS parent/child logic 290 may provide an outsourced SMS solution (e.g., making a decision about what elements to choose to navigate through multiple networks) for the providers, which may lower the barrier for entry into system 100 for smaller providers and/or for enterprises.

Although FIG. 2 shows exemplary components of a service server 110, in other implementations, service server 110 may contain fewer, different, or additional components than depicted in FIG. 2. In still other implementations, one or more components of service servers 110 may perform one or more other tasks performed by one or more other components of service servers 110.

Figure 3:
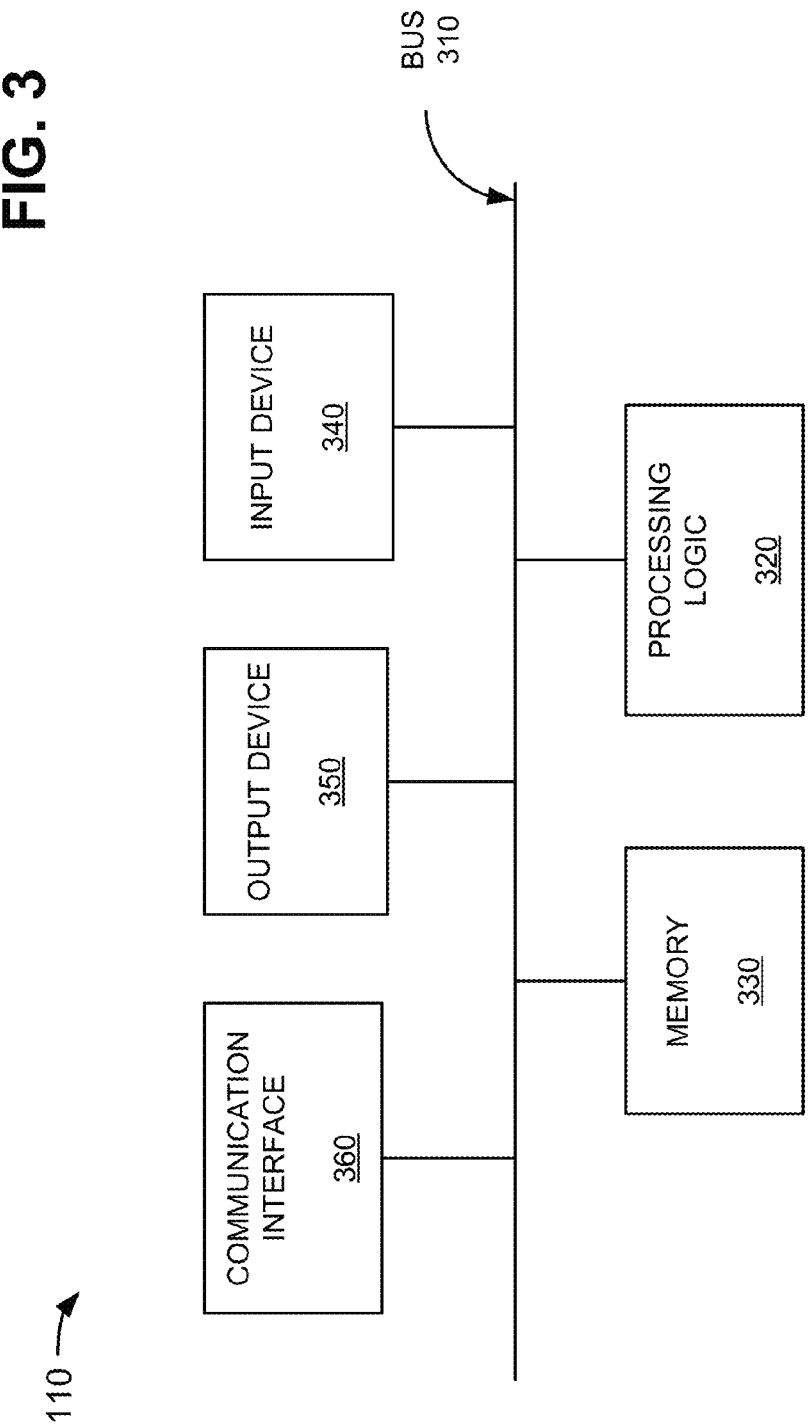
FIG. 3 is a block diagram of an exemplary configuration of a service server of FIG. 1.

FIG. 3 illustrates a possible configuration of one of service servers 110. The other service servers 110 may contain comparable configurations. As illustrated, service server 110 may include a bus 310, processing logic 320, a memory 330, an input device 340, an output device 350, and a communication interface 360. In other implementations, service server 110 may include fewer, additional, or different components that aid in receiving, transmitting, and/or processing data. Moreover, other configurations are possible.

Bus 310 may permit communication among the components of service server 110. Processing logic 320 may include any type of processor or microprocessor that interprets and executes instructions. In other implementations, processing logic 320 may be implemented as or include an application specific integrated circuit (ASIC), a field programmable gate array (FPGA), or the like. Memory 330 may include a random access memory (RAM) or another type of dynamic storage device that stores information and instructions for execution by processing logic 320, a read only memory (ROM) or another type of static storage device that stores static information and instructions for the processing logic 320, and/or some other type of magnetic or optical recording medium and its corresponding drive for storing information and/or instructions.

Input device 340 may include a device that permits an operator to input information to service server 110, such as a keyboard, a keypad, a mouse, a pen, a microphone, one or more biometric mechanisms, or the like. Output device 350 may include a device that outputs information to the operator, such as a display, a speaker, etc.

Communication interface 360 may include any transceiver-like mechanism that enables service server 110 to communicate with other devices and/or systems. For example, communication interface 360 may include mechanisms for communicating with other devices, such as end-user devices (e.g., personal computers, laptops, set-top boxes, television monitors, etc.).

Service server 110 may perform functions described herein. Service server 110 may perform these and other functions in response to processing logic 320 executing software instructions contained in a computer-readable medium, such as memory 330. A computer-readable medium may be defined as one or more memory devices. The software instructions may be read into memory 330 from another computer-readable medium or from another device via communication interface 360. The software instructions contained in memory 330 may cause processing logic 320 to perform processes described herein. Alternatively, hardwired circuitry may be used in place of or in combination with software instructions to implement processes consistent with exemplary embodiments. Thus, systems and methods described herein are not limited to any specific combination of hardware circuitry and software.

Exemplary Network Application Platform

Figure 4:
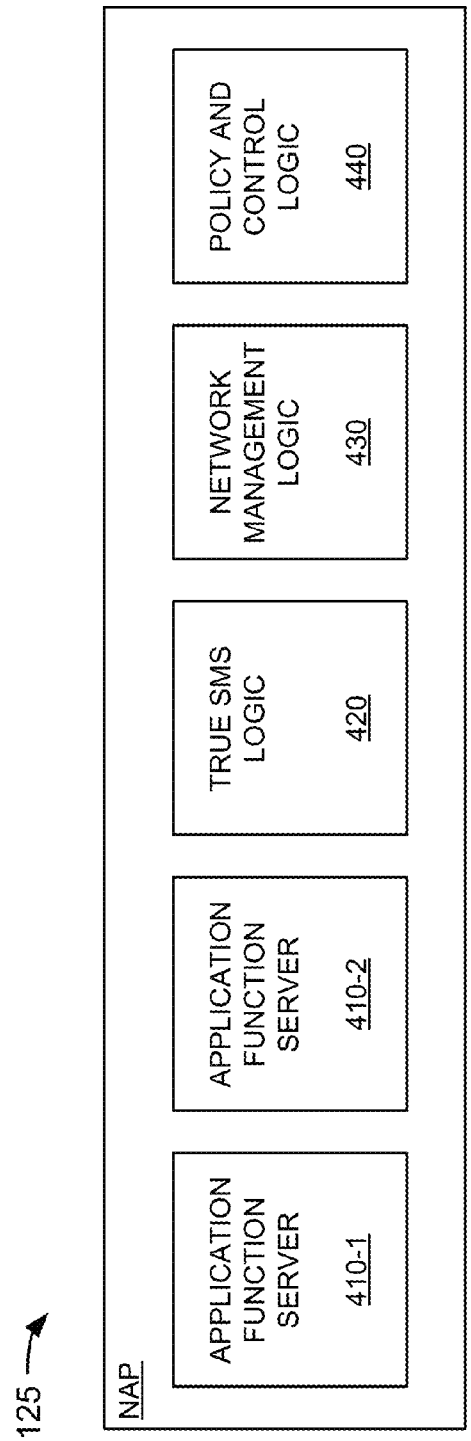
FIG. 4 illustrates an example of components of a network application platform (NAP)

FIG. 4 illustrates an example of components of NAP 125 of one of service providers 120. As illustrated, NAP 125 may include one or more application function servers 410-1, 410-2 (collectively referred to as "application function servers 410"), true SMS logic 420, network management logic 430, and/or policy and control logic 440. NAP 125 may be provided at each of service providers 120. NAP 125 may cooperate with service servers 110 to (a) enable service providers 120 to charge for use of their services and (b) provide an infrastructure to facilitate automated creation of pan-provider services.

Each of application function servers 410 may include server entities that integrate application functions. In one exemplary implementation, each of application function servers 410 may include blade servers. Blade servers may provide specific services, such as, for example, web hosting or cluster computing.

True SMS logic 420 may include hardware- and/or software-based logic to perform SMS services on behalf of service providers 120 of system 100. True SMS logic 420 may provide a management system to integrate services, resources and/or processes from each of application function servers 410.

Network management logic 430 may include hardware- and/or software-based logic to perform network management services on behalf of service providers 120 of system 100. In one implementation, Network management logic 430 may allow administrators to define service offerings as they need them and automatically provision the network to deliver those services. Network management logic 430 may enable creation and deployment of new IP services to multiple users and support service deployment over a variety of broadband access technologies such as Wi-Fi 802.11 wireless hotspots, DSL, cable, Ethernet, ATM, Frame Relay, SONET and fixed wireless.

Policy and control logic 440 may include hardware- and/or software-based logic to perform policy and control services on behalf of service providers 120 of system 100. For example, policy and control logic 440 may provide a suite of policy and control functions (e.g., IPsphere SMS and other application functions). Policy and control logic 440 may include features that protect the integrity of a network by ensuring both the user and the user device meet particular security policies before the user and the user device are granted access to the network.

Exemplary Process

Figure 5:
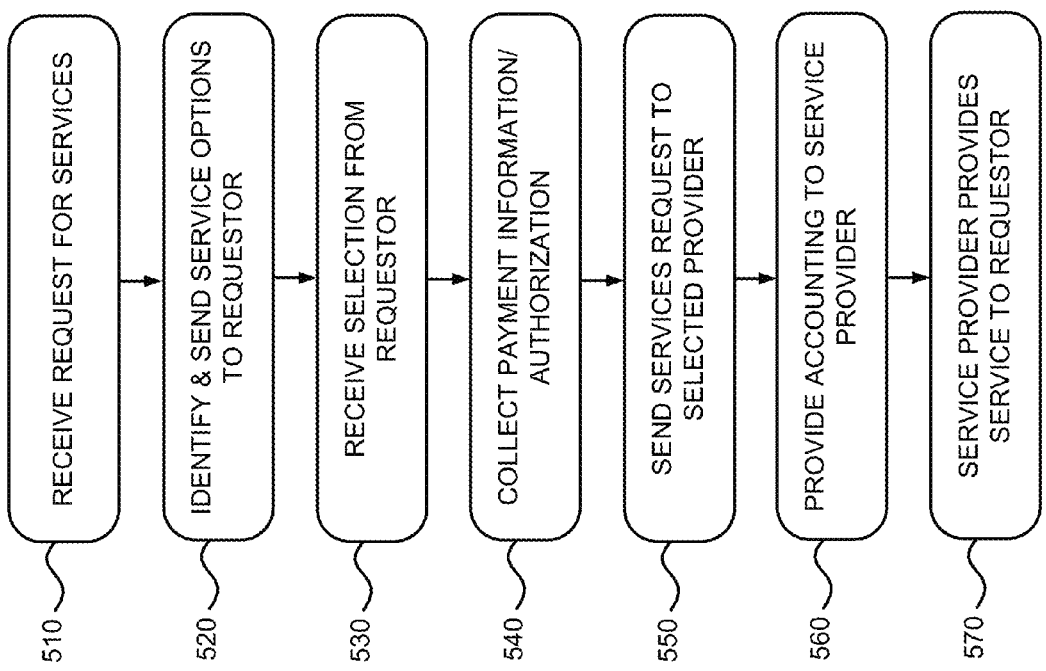
FIG. 5 is a flow diagram illustrating an exemplary process performed by components of the network of FIG. 1.

FIG. 5 is a flow diagram illustrating an exemplary process by components of the network of FIG. 1. The process may begin in response to a customer seeking services provided through a network, such as network 195. The customer may be a user of a user device 190 having previously registered for services provided by services server 110 and having been assigned a GUID.

A request for services may be received (block 510). For example, a user device, such as one of user devices 190, may submit a request for services to a service provider. The request may be for one or more of a variety of services, including general content, VoD, VoIP, gaming content, video conferencing, and/or enterprise system services. Interactive gaming content is used as an exemplary (and-non-limiting) type of service for discussion of FIG. 5. Interactive gaming content may be provided, for example, from one or more of gaming providers 160 via service provider 120-1. Rather than the request from the user device being submitted directly to service provider 120-1 or gaming provider 160, the request may be submitted to a service server, such as service server 110.

Service options may be identified and sent to the requestor (block 520). For example, service server 110 may identify options for providing interactive gaming content from one or more gaming providers 160 through one or more service providers, such as service provider 120-1 or 120-2. Service options may include multiple gaming providers and/or price levels for various gaming environments. In one implementation, service providers 120-1 and/or 120-2 may register with service server 110 to receive a GUID that may enable service server 110 to allocate payment for services provided by each service provider. In one implementation, available service options may be determined by service server 110 based on information previously provided to service server 110. The information may be stored, for example, in a database (such as in service repositories 210 of FIG. 2) that may contain descriptions of individual elements of interactive gaming content available to users. In another implementation, the options may be provided from service providers and/or content providers to service server 110 in response to a request from service server 110. Available options responsive to the request from user device 190 may be sent from service server 110 to user device 190. The requestor (e.g., a user of user device 190) may select from one or more of the provided options for interactive gaming content.

A selection may be received from the requestor (block 530). For example, based on the list of service options provided from service server 110 to user device 190, the requestor may select one or more service options for interactive gaming content. The requestor's selection of the provided option(s) may be sent from the requestor's user device 190 to service server 110. The selection may include, for example, identification of the service provider and/or a particular type of service offered by the provider. Service server 110 may receive the requestor's selection.

Payment information and/or authorization may be collected (block 540). For example, service server 110 (using, for example, transaction accounting/billing logic 250) may collect payment information from user device 190 for accessing or using service provider 120-1 and/or the interactive gaming content of gaming provider 160. In another implementation, payment information may be stored prior to the request from user device 190 so that the user can simply authorize payment.

A services request may be sent to the selected provider (block 550). For example, service server 110 may send a request to facilitate the requestor's selection to the appropriate service provider, such as service provider 120-1. In one implementation, the request to facilitate the requestor's selection may be enabled through use of GUIDs assigned to the requestor, service provider 120-1, and/or gaming provider 160.

An accounting to the service provider may be provided (block 560). For example, the information regarding the requestor's payment may be sent from service server 110 to service provider 120-1. Depending on the fees structure for the particular service, the accounting may be sent, for example, along with the services request of block 550. The accounting may allocate payment for the selected interactive gaming content to service provider 120-1 and to another component that enabled the service provider to provide the selected service option, such as gaming provider 160 and/or another network provider. In another implementation, service server 110 may arrange for compensation by charging a listing fee, a recurring fee, a percentage of transaction fee, and/or any other fee-based arrangement. In another implementation, service server 110 may customize the accounting output to each provider's particular OSS format.

Services may be provided to the requestor (block 570). For example, once the request for interactive gaming content has been received at service provider 120-1, service provider 120-1 may begin to supply services from gaming provider 160 to the requestor's user device 190. In another implementation, service provider 120-1 may supply stored content previously provided from gaming provider 160. In some implementations, service provider 120-1 may track usage time, bandwidth use, or other aspects of the services provided and provide an accounting to service server 110.

EXAMPLE

Figure 6:
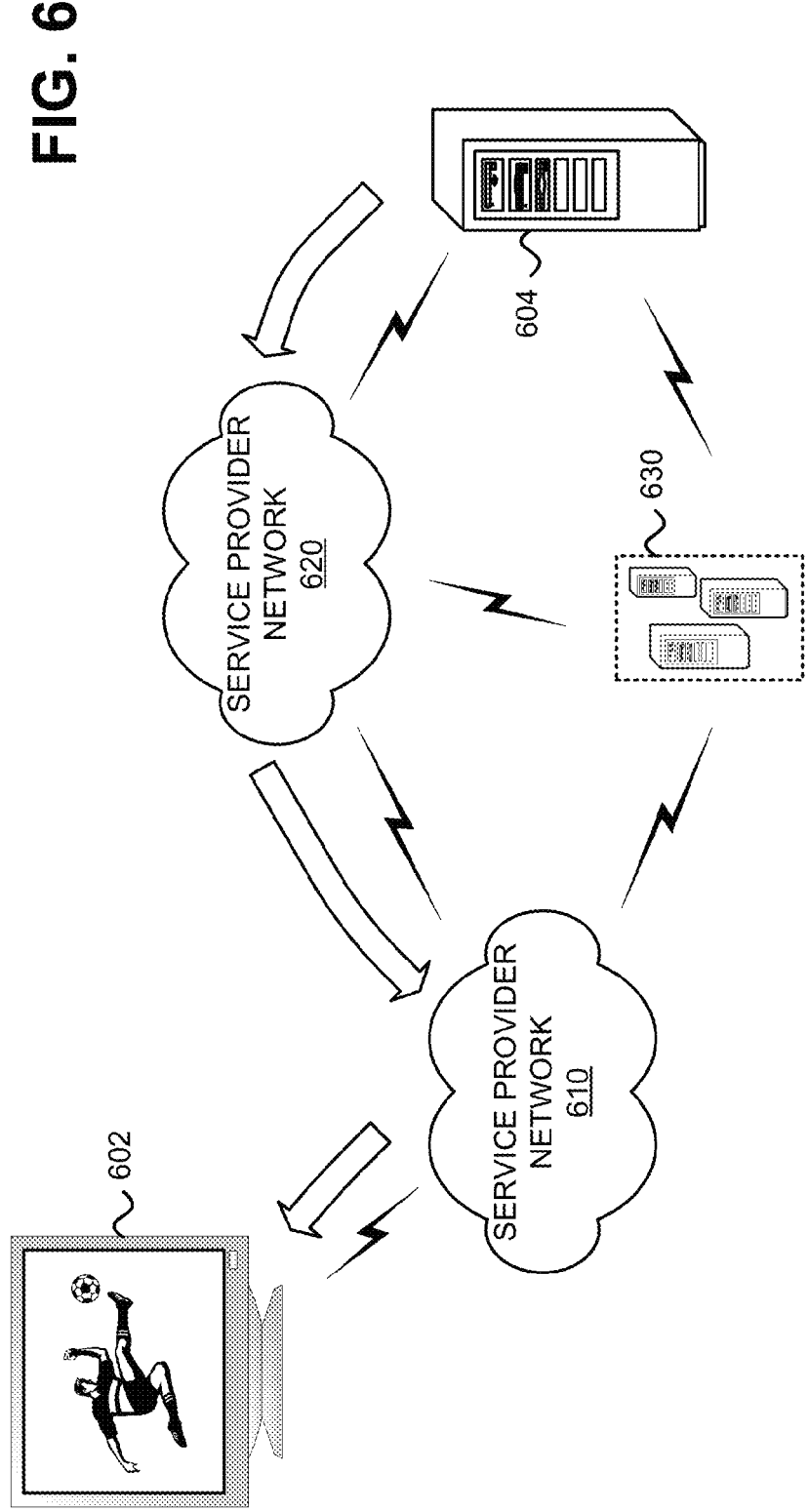
FIG. 6 illustrates an exemplary use for the network of FIG. 1 according to an exemplary implementation.

FIG. 6 illustrates an exemplary use of the systems and methods described herein. In FIG. 6, a user using computer 602 (which may correspond to user device 190 of FIG. 1) may be located in the United States and desire to view a particular video-on-demand titled "German Futbol." The video material may be available only from VoD provider 604 in Germany. Computer 602 may have access to service provider network 610 which provides network services throughout the United States. VoD provider 604 may have access to service provider network 620 that provides network services in Germany and other regions outside the United States.

User of computer 602, VoD provider 604, service provider network 610, and service provider network 620 may all have registered with service server 630 to allow services to be sold using service server 630. Upon registration as a user, computer 602 may provide payment information for service server 630 to use when computer 602 requests services through service server 630. Upon registration as a content provider, VoD provider 604 may provide content options (e.g., a list of videos available for purchase) and fee terms with its registration. As part of registration as a service provider, service provider network 610 and service provider network 620 may define fee arrangements and receive NAP materials to allow them to automatically provision their networks to deliver requested services. Each of the user of computer 602, VoD provider 604, service provider network 610, and service provider network 620 may have a GUID assigned at the time of registration to facilitate transactions.

The user may use computer 602 to request access to the "German Futbol" video through service server 630. Service server 630 may identify VoD provider 604 as the service provider for "German Futbol" and identify two versions of the video. A high-definition (HD) version may be available for 2 Euros, while a lower-resolution version may be available for 1 Euro. Services server 630 may provide these options to computer 602. The user at computer 602 may select the HD video option and authorize electronic payment of 2 Euros. Upon receiving the authorization, services server 630 may send a request to VoD provider 604 to send the HD "German Futbol" video content to computer 602. VoD provider 604 may provide the requested video content to computer 602 through service provider network 620 and service provider network 610. Service server 630 may allocate the 2 Euro payment among VoD provider 604, service provider network 610, service provider network 620, and/or service server 630 according to the terms agreed upon at registration (or at another point prior to the transaction with the user).

CONCLUSION

Implementations described herein provide for systems and methods that create a service for elements of multiple stakeholders to enable the multiple stakeholders to collect revenue or a percentage of revenue for use of their elements in a network environment. The foregoing description of exemplary implementations provides illustration and description, but is not intended to be exhaustive or to limit the invention to the precise form disclosed. Modifications and variations are possible in light of the above teachings or may be acquired from practice of the invention.

For example, features have been described above with respect to providing requested content to a user from a service provider. However, requested content may, in some implementations, be provided to the user directly from a service server, such as service server 110. Content may be supplied to the service server from, for example, a service provider prior to the user's request.

In addition, while a series of blocks has been described with respect to FIG. 5, the order of the blocks may be varied in other implementations. Moreover, non-dependent blocks may be implemented in parallel.

It will be apparent that various features described above may be implemented in many different forms of software, firmware, and hardware in the implementations illustrated in the figures. The actual software code or specialized control hardware used to implement the various features is not limiting of the invention. Thus, the operation and behavior of the aspects of the invention were described without reference to the specific software code—it being understood that one would be able to design software and control hardware to implement the various features based on the description herein.

Further, certain portions of the invention may be implemented as "logic" that performs one or more functions. This logic may include firmware, hardware, such as a processor, a microprocessor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   collecting, by one or more devices, payment for a service provided to a device via a network; and
   allocating, by the one or more devices, the payment between a first provider of the service and a second provider of a particular component within the network that enables the first provider to provide the service via the particular component to the device,
   the first provider of the service being different from the second provider of the particular component.

2. The method of claim 1, further comprising:
   receiving a request from the device; and
   identifying the service based on the request.

3. The method of claim 2, where identifying the service includes:
   identifying, based on the request, one or more options for the device,
      the one or more options including an option for the service;
   sending, to the device, information regarding the one or more options;
   receiving, from the device, a selection of the option for the service; and
   identifying the service based on the selection of the option for the service.

4. The method of claim 1, where collecting the payment for the service includes:
   receiving, from the device, payment information for the service; and
   collecting the payment for the service based on the payment information.

5. The method of claim 1, further comprising:
   sending, to the first provider, a request to provide the service to the device.

6. The method of claim 1, further comprising:
   providing, based on allocating the payment, accounting information to the first provider.

7. The method of claim 1,
   where the device is located within a first geographic area,
   where the first provider is located within a second geographic area that is different from the first geographic area, and
   where the particular component is located within the first geographic area or within a third geographic area that is between the first geographic area and the second geographic area.

8. The method of claim 1, where the service includes one of:
   a video-on demand service,
   a gaming service,
   a Voice over Internet Protocol (VoIP) service,
   a video conferencing service, or
   an enterprise system service.

9. A system comprising:
   one or more processors to:
      collect payment for a service provided to a device via a network; and
      allocate the payment between a first provider of the service and a second provider of a particular component within the network that enables the first provider to provide the service via the particular component to the device,
         the first provider of the service being different from the second provider of the particular component.

10. The system of claim 9, where, when collecting the payment, the one or more processors are to:
    receive payment information from the device; and
    collect the payment based on the payment information.

11. The system of claim 9, where the one or more processors are further to:
    receive, from the first provider, information regarding options provided by the first provider, receive, from the device, a first request associated with the service, identify the first provider based on the first request and the options, and transmit, to the first provider, a second request to provide the service to the device.

12. The system of claim 9, where, when allocating the payment, the one or more processors are to:

allocate the payment between the first provider of the service, the second provider of the particular component, and a third provider of the system.

13. The system of claim 9, where the first provider is located within a first geographic area, and where the particular component is located within a second geographic area that is different from the first geographic area.

14. The system of claim 9, where the one or more processors are further to:

provide, based on allocating the payment, accounting information to the first provider.

15. The system of claim 9, where the one or more processors are further to:

identify one or more paths that connect the device and the first provider, and identify the particular component based on the one or more paths.

16. A non-transitory computer-readable medium storing instructions, the instructions comprising:

one or more instructions that, when executed by at least one processor, cause the at least one processor to:

collect payment for a service provided to a device via a network; and allocate the payment between a first provider of the service and a second provider of a particular component within the network that enables the first provider to provide the service via the particular component to the device, the first provider of the service being different from the second provider of the particular component.

17. The non-transitory computer-readable medium of claim 16, where the instructions further comprise:

one or more instructions that, when executed by the at least one processor, cause the at least one processor to:

receive a request from the device, identify, based on the request, an option for providing the service to the device, transmit, to the device, information regarding the option, and receive, from the device, authorization to provide the service based on the option.

18. The non-transitory computer-readable medium of claim 16, where the first provider is located within a first geographic area, and where the particular component is located within a second geographic area that is different from the first geographic area.

19. The non-transitory computer-readable medium of claim 16, where the instructions further comprise:

one or more instructions that, when executed by the at least one processor, cause the at least one processor to:

identify one or more paths that connect the device and the first provider, and identify the particular component based on the one or more paths.

20. The non-transitory computer-readable medium of claim 16, where the instructions further comprise:

one or more instructions that, when executed by the at least one processor, cause the at least one processor to:

provide, based on allocating the payment, accounting information to the first provider.

* * * * *